(12) United States Patent
Muthuswamy et al.

(10) Patent No.: US 12,373,763 B2
(45) Date of Patent: Jul. 29, 2025

(54) SYSTEM AND METHOD TO OPTIMIZE PROCESSING PIPELINE FOR KEY PERFORMANCE INDICATORS

(71) Applicant: International Business Machines Corporation, Armonk, NY (US)

(72) Inventors: Srinivasan S. Muthuswamy, Bangalore (IN); Mukesh Kumar, Bangalore (IN); Willie Robert Patten, Jr., Hurdle Mills, NC (US); Subhendu Das, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 17/370,429

(22) Filed: Jul. 8, 2021

(65) Prior Publication Data
US 2023/0010019 A1     Jan. 12, 2023

(51) Int. Cl.
*G06Q 10/067*     (2023.01)
*G06N 20/00*     (2019.01)
(Continued)

(52) U.S. Cl.
CPC ........... *G06Q 10/067* (2013.01); *G06Q 10/04* (2013.01); *G06Q 10/06316* (2013.01);
(Continued)

(58) Field of Classification Search
None
See application file for complete search history.

(56) References Cited

U.S. PATENT DOCUMENTS

| 7,643,974 B2 | 1/2010 | Harper et al. |
| 9,396,037 B2 | 7/2016 | Morsi et al. |

(Continued)

FOREIGN PATENT DOCUMENTS

| CN | 101093518 B | | 4/2010 | |
| CN | 104424285 A | * | 3/2015 | ............. G06Q 10/06 |
| WO | WO-2018156976 A2 | * | 8/2018 | ............. G06F 15/76 |

OTHER PUBLICATIONS

Krishnan, Sanjay, and Eugene Wu. "Alphaclean: Automatic generation of data cleaning pipelines." arXiv preprint arXiv:1904. 11827 (Year: 2019).*

(Continued)

*Primary Examiner* — Jerry O'Connor
*Assistant Examiner* — Matthew H Divelbiss
(74) *Attorney, Agent, or Firm* — Scully, Scott, Murphy & Presser, P.C.

(57) ABSTRACT

A computer-implemented system, platform, computer program product, and/or method for optimizing a data analytics suspicious activity detection pipeline that includes identifying a data analytics suspicious activity detection (SAD) pipeline for optimization; inputting desired key performance indicators for the data analytics suspicious activity detection (SAD) pipeline; gathering key performance indicators from previous runs of the data analytics suspicious activity detection (SAD) pipeline; identifying candidate pipeline configurations for simulation runs; running simulations of the candidate pipeline configurations; analyzing the simulations of the candidate pipeline configurations; and identifying the optimal pipeline configuration for the desired key performance indicators.

20 Claims, 8 Drawing Sheets

(51) Int. Cl.
  *G06Q 10/04* (2023.01)
  *G06Q 10/0631* (2023.01)
  *G06Q 10/0639* (2023.01)
  *G06Q 40/02* (2023.01)
  *G06Q 40/08* (2012.01)

(52) U.S. Cl.
  CPC ....... *G06Q 10/06393* (2013.01); *G06Q 40/02* (2013.01); *G06N 20/00* (2019.01); *G06Q 40/08* (2013.01)

(56) References Cited

U.S. PATENT DOCUMENTS

| | | | |
|---|---|---|---|
| 9,438,648 B2 | 9/2016 | Asenjo et al. | |
| 9,514,214 B2 | 12/2016 | Chandramouli et al. | |
| 9,548,941 B2 | 1/2017 | Tompkins | |
| 9,749,430 B2 | 8/2017 | Nano et al. | |
| 2006/0004616 A1* | 1/2006 | Yamashita | G06Q 10/063112 705/7.14 |
| 2007/0261038 A1 | 11/2007 | Suba et al. | |
| 2008/0189687 A1* | 8/2008 | Levine | G06F 11/3636 717/128 |
| 2011/0112974 A1* | 5/2011 | Hinton | G06Q 30/018 705/317 |
| 2011/0131554 A1* | 6/2011 | Doi | G06F 8/4441 717/131 |
| 2014/0272885 A1* | 9/2014 | Allen | G09B 7/00 434/322 |
| 2014/0310034 A1 | 10/2014 | Li et al. | |
| 2014/0372924 A1 | 12/2014 | Shih | |
| 2015/0339572 A1* | 11/2015 | Achin | G06N 20/00 706/46 |
| 2016/0004987 A1 | 1/2016 | Shroff et al. | |
| 2016/0171413 A1* | 6/2016 | Kalyanaraman | G06Q 10/067 705/7.37 |
| 2016/0253172 A1* | 9/2016 | Shani | G06F 8/70 717/101 |
| 2016/0330219 A1* | 11/2016 | Hasan | G06N 20/00 |
| 2017/0090994 A1 | 3/2017 | Jubinski et al. | |
| 2018/0330300 A1 | 11/2018 | Runkana et al. | |
| 2019/0068443 A1 | 2/2019 | Li et al. | |
| 2019/0340558 A1 | 11/2019 | Alifantis et al. | |

OTHER PUBLICATIONS

Rausch, Thomas, Waldemar Hummer, and Vinod Muthusamy. "PipeSim: Trace-driven simulation of large-scale AI operations platforms." arXiv preprint arXiv:2006.12587 (Year: 2020).*

Axel Buecker et al., IBM Security Solutions Architecture for Network, Server and Endpoint, Feb. 2011, IBM Redbooks (Year: 2011).*

Zhu, X., et al., "Industrial big data-based scheduling modeling framework for complex manufacturing system," Advances in Mechanical Engineering 9, No. 8, 2017, 12 pages.

AutoAI Overview, Retrieved from: AutoAI overview—Docs | IBM Cloud Pak for Data as a Service, Nov. 22, 2024, 1 page.

* cited by examiner

SYSTEM AND METHOD TO OPTIMIZE PROCESSING PIPELINE FOR KEY PERFORMANCE INDICATORS

FIELD

The present application relates generally to information handling, data processing, and/or data analytics, and more particularly to systems, platforms, computer program products, and/or methods for detecting suspicious activities, e.g., suspicious financial transactions and/or insurance claims.

BACKGROUND

There is a regulatory need for monitoring financial transactions and activity of account holders at financial institutions and monitoring insurance claims to detect any suspicious, fraudulent, and/or criminal activity such as, for example, money laundering, terrorist financing, credit card theft, and/or insurance claim fraud. Governmental anti-money laundering (AML) and other regulations may require a financial institution to monitor for activities and behavior indicative of criminal or fraudulent activity. Detecting activity indicative of fraudulent or criminal activity is increasingly difficult due to the large amount of data and information, such as, for example, numerous financial transactions, numerous insurance claims, and numerous parties/entities.

There have been developed electronic systems and data analytical processes to detect activity indicative of fraud, criminal behavior, and other suspicious activity. These advanced information and data processing systems discover, define, and detect data patterns within relationship networks, for example, a large-scale network of financial transactions, insurance claims, and the like involving numerous parties and transactions, that are indicative of suspicious activity and behavior.

In the financial crime scenario and/or insurance claims processing, the electronic systems and data analytical processes create alerts that are often reviewed by analysts and managers, each having different roles in the analysis and vetting process. In typical scenarios, new data is imported into the electronic data analytics system, for example a day's financial transactions, new insurance claims, and/or updated insurance claims processing, and electronic analytical processes are run for example on all the data, old and new data, and the electronic data analytics system generates alerts. The alerts can take many forms and generally will flag a person or incident that is suspicious and might require further review and analysis. The alert goes to a case manager who reviews the alert, and if the alert is credible, then it might be investigated by an internal team, and if the internal team finds the alert credible then typically a suspicious activity report or suspicious claim report is prepared.

Suspicious activity processing pipelines are long running processes that often involve multiple data sets, data pre-processing, data clean-up, data filtering, data transformation, data analytic models, rules, algorithms, and/or ensemble models to produce results. Often multiple simulations are run to produce the best possible run. Customers or clients often supply the data processing entity with guidelines on the Key Performance Indicators (KPIs), such as, for example, time for the pipeline line to complete, the amount of CPU and/or memory the pipeline can consume, and/or the F1 score (an indicator of how well the pipeline performs (e.g., the probability of the pipeline)) for the pipeline results. The KPIs can be expressed as values, or can be expressed as boundaries (such as upper and lower limits) to indicate flexibility. Often the data science team focuses on maximizing the model accuracy (the F1 score) and loses focus on the overall performance of the suspicious activity detection (SAD) pipeline. It would be advantageous to provide a system, platform, computer program product, and/or method to optimize the suspicious activity detecting (SAD) pipeline for the desired KPIs.

SUMMARY

The summary of the disclosure is given to aid understanding of, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, platform, processing pipeline, their architectural structure, the computer program product, and/or their method of operation to achieve different effects. In this regard it will be appreciated that the disclosure presents and describes one or more inventions, and in aspects includes numerous inventions as defined by the claims.

One or more embodiments of a system, platform, computer program product, and/or method is disclosed for optimizing a data analytics suspicious activity detection (SAD) pipeline that includes: identifying a data analytics suspicious activity detection (SAD) pipeline for optimization; inputting desired key performance indicators for the data analytics suspicious activity detection (SAD) pipeline; gathering key performance indicators from previous runs of the data analytics suspicious activity detection (SAD) pipeline; identifying candidate pipeline configurations for simulation runs; running simulations of the candidate pipeline configurations; and analyzing the simulations of the candidate pipeline configurations. In one or more approaches, the system, platform, computer program product, and/or method includes identifying the optimal pipeline configuration for the desired key performance indicators. The system, platform, computer program product, and/or method in an aspect optionally includes identifying hotspot tasks that were not susceptible to improvement by the method of optimizing the data analytics suspicious activity detection pipeline and/or identifying and removing tasks that have no or negligible effect on the data analytics suspicious activity detection pipeline.

According to one or more aspects, the system, platform, computer program product, and/or method optionally includes applying fine tune variations that reorganize the order of steps, tasks, and/or functions in the data analytics suspicious activity pipeline, where in an approach applying the fine tune options is based upon the dependencies of the tasks in the data analytics suspicious activity detection pipeline. Identifying candidate pipeline configurations for simulation runs includes in one or more embodiments, identifying at least one of the group consisting of removing tasks, reconfiguring tasks, updating tasks, re-ordering tasks, and combinations thereof. In an optional approach identifying the candidate pipeline configurations includes using the gathered key performance identifiers to identify candidate pipeline configurations for simulation runs, and in an optional aspect using the gathered key performance identifiers includes identifying tasks that have an outsized effect on one or more of the key performance identifiers. In another optional approach, identifying the candidate pipeline configurations includes creating a matrix of candidate pipeline configurations for simulation runs. In a further embodiment, the candidate pipeline configurations identified for simulation runs are limited to the top N candidate pipeline configurations.

In an embodiment, the computer programming product includes instructions that, when executed by at least one hardware processor, configure the at least one hardware processor to perform one or more of the steps, tasks, and/or functions described herein, and the system and/or platform includes a non-transitory memory storage device storing program instructions; and a hardware processor having circuitry and logic to execute said program instructions, wherein the hardware processor is in communication with said memory storage device and in response to executing said program instructions, is configured to perform the steps, task, and/or functions described herein.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and embodiments of a system, platform, computer program product, and/or method to optimize a suspicious activity detection (SAD) pipeline for desired KPIs will be better understood when read in conjunction with the figures provided. Embodiments are provided in the figures for the purpose of illustrating aspects, features, and/or various embodiments of the systems, platforms, computer program products, and/or methods, but the claims should not be limited to the precise arrangement, structures, features, aspects, systems, platforms, modules, functional units, assemblies, subassemblies, circuitry, embodiments, instructions, programming, methods, processes, techniques, and/or devices shown, and the arrangements, structures, features, aspects, systems, platforms, modules, functional units, assemblies, subassemblies, circuitry, embodiments, instructions, programming, methods, processes, techniques, and/or devices shown may be used singularly or in combination with other arrangements, structures, features, aspects, assemblies, subassemblies, systems, platforms, modules, functional units, circuitry, embodiments, instructions, programming, methods, techniques, processes, and/or devices.

DETAILED DESCRIPTION

The following description is made for illustrating the general principles of the invention and is not meant to limit the inventive concepts claimed herein. In the following detailed description, numerous details are set forth in order to provide an understanding of the system, platform, computer program product, method, and/or techniques for optimizing a pipeline for detecting suspicious activity, however, it will be understood by those skilled in the art that different and numerous embodiments of the system, platform, computer program product and/or their method of operation may be practiced without those specific details, and the claims and disclosure should not be limited to the arrangements, structures, systems, assemblies, subassemblies, platforms, modules, functional units, circuitry, embodiments, features, aspects, instructions, programming, processes, methods, techniques, and/or details specifically described and shown herein. Further, particular features, aspects, arrangements, structures, systems, assemblies, subassemblies, platforms, modules, functional units, circuitry, embodiments, instructions, programming, processes, methods, techniques, details, etc. described herein can be used in combination with other described features, aspects, arrangements, structures, systems, assemblies, subassemblies, platforms, modules, functional units, circuitry, embodiments, instructions, programming, processes, methods, techniques, details, etc. in each of the various possible combinations and permutations.

The following discussion omits or only briefly describes conventional features of information processing systems and data networks, including electronic data analytics programs or electronic risk assessment tools, platforms, computer program products and/or methods configured and adapted to detect suspicious activity and generate alerts in connection therewith, for example, financial and/or insurance claim transactions, which should be apparent to those skilled in the art. It is assumed that those skilled in the art are familiar with data processing and data analytics including large scale data processing/analytics (also referred to as information/data processing systems) and their operation, and the application of data analytics, including data analytics systems and processes to detect suspicious activity that may be indicative of fraud and/or other criminal behavior. It may be noted that a numbered element is numbered according to the figure in which the element is introduced, and is typically referred to by that number throughout succeeding figures.

Figure 1:
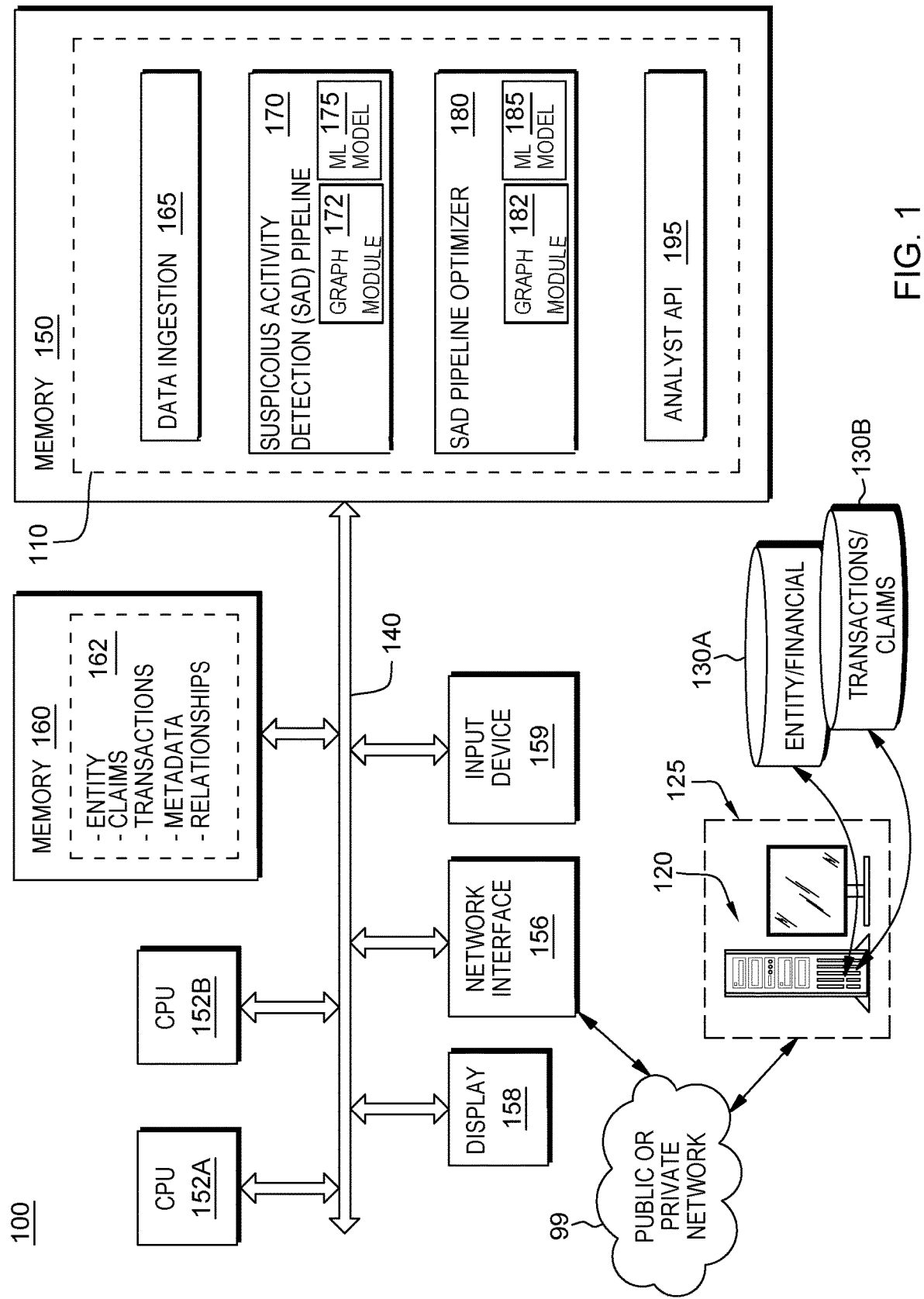
FIG. 1 schematically shows an exemplary computer system/computing device which is applicable to implement one or more embodiments of the suspicious activity and risk assessment tool of the present disclosure.

FIG. 1 illustrates an example computer system functioning as an electronic risk assessment tool 100 implementing methods to detect suspicious activity in the domain of financial services, insurance claims processing, and related industries, e.g., insurance claim fraud and financial fraud detection. In one or more embodiments, such a system tool 100 may be employed by or for a financial institution or insurance company who may issue, or a regulatory authority who may receive, a suspicious activity report or suspicious claim report concerning a particular party, organization, and/or transaction(s). The suspicious activity report or claim may be issued by an insurance company or financial institution against an entity or party who has been found to participate in suspicious activity, e.g., the insurance company has found a suspicious claim undertaken by a given party. In insurance fraud, a "suspicious" entity may be a doctor, auto body shop, a claimant, or any party. Suspicious entities may be placed on a "watch" list.

In the context of detecting suspicious financial activity and/or suspicious insurance claim processing, risk assessment tool 100, according to one embodiment, is a computer system, a computing device, a mobile device, or a server configured to run risk assessment software applications and models. In some aspects, computing device 100 may include, for example, personal computers, laptops, tablets, smart devices, smart phones, or any other similar computing device, an embodiment of which is described in more detail in FIG. 9.

Computing system 100 includes one or more hardware processors 152A, 152B (also referred to as central processing units (CPUs)), a memory 150 (e.g., for storing an operating system, application program interfaces (APIs) and program instructions), a network interface 156, a display device 158, an input device 159, and any other features common to a computing device. In one or more aspects, computing system 100 may, for example, be any computing device that is configured to communicate with one or more networks and/or websites 125 including a cloud-based or web-based server 120 over a public or private communications network 99. For instance, network 125 may include an insurance company or financial institution that records/stores information, e.g., multiple insurance claims and/or financial transactions occurring between numerous parties (entities). Such insurance claims and/or electronic transactions may be stored in a database 130B with associated entity, claims, and/or financial information stored in related database 130A. Further, as shown as part of system 100, there can be a local memory and/or an attached memory storage device 160, or a remote memory storage device, e.g., a database, accessible via a remote network connection for input to the system 100.

In the embodiment depicted in FIG. 1, processors 152A, 152B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 152A, 152B are configured to execute instructions as described below. These instructions may be stored, for example, as programmed modules in an associated memory storage device 150.

Memory 150 may include, for example, non-transitory computer readable media in the form of volatile memory, such as random-access memory (RAM) and/or cache memory or others. Memory 150 may include, for example, other removable/non-removable, volatile/non-volatile storage media. By way of non-limiting examples only, memory 150 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a network and/or web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 158 may include a liquid crystal display (LCD), an e-paper/e-ink display, an organic LED (OLED) display, or other similar display technologies. In an aspect, display 158 may be touch-sensitive and may also function as an input device. Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system as a risk assessment tool 100 for detecting suspicious activity, e.g., insurance fraud and/or financial fraud, and creating alerts, the local or remote memory 160 may be configured for storing information and associated meta-data. Such captured and stored data can include, but is not limited to: parties, claims, accounts, transactions, relationships, and associated metadata obtained from claims, transactions and/or data stored in the electronic databases 130A, 130B. Alternately or in addition, the entity data, entity relationships, claims, transactional data and meta-data 162 can be stored in a separate local memory storage device attached to the computer system 100.

Memory 150 of computer system 100 in one or more embodiments stores processing modules that include programmed instructions adapted to perform risk assessment as it relates to detecting suspicious activity, e.g., financial fraud, money laundering, insurance fraud, and creating alerts or SARs.

In an embodiment, one of the programmed processing modules stored at the associated memory 150 include a data ingestion module 165 that provides instructions and logic for operating circuitry to access/read large amounts of data (e.g., parties, claims/accounts, transaction data) for use by other modules that process and analyze the data to form and output alerts. In one or more embodiments, the input data for data ingestion module 165 comprises parties, accounts, claims, transactions, etc. For example, where a financial institution, such as for example a bank, desires to determine if there is a money laundering scheme or other fraud, for example as a result of governmental oversight, or regulations, such as for example anti-money laundering (AML) laws, the input data can comprise: the transactions occurring with or being processed by the financial institution; the parties to any financial transaction with or through the financial institution; and account information (the customers) of the financial institution. In the case of an insurance organization and the like, the input data can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing the motor vehicle, physician treating patient, etc. The examples above are not limiting and there can be other situations where the system will have application, and additional or other input data can be provided.

In an embodiment, memory 150 includes a Suspicious Activity Detection (SAD) Pipeline Module 170 (also referred to as a SAD Pipeline Platform 170) that provides instructions and logic for operating circuitry to process and analyze data, typically large amounts of data, to form a suspicious activity detection (SAD) pipeline that generates and output alerts. Suspicious Activity Detection (SAD) Pipeline Platform 170 (also referred to as SAD Platform 170, SAD Pipeline Platform 170, or SAD Pipeline Generator 170) preferably contains one or more models to determine a suspicious activity risk probability based on the variables, and/or data. Based on the data and the models, alerts and/or SARs can be produced by the SAD Platform 170, and an analyst can analyze the alert, and provide feedback as to a potential risk level of a party, insurance claim, and/or transaction.

SAD Platform 170 can contain and call up one or more models to process and analyze the data and provide associated alerts for review by an analyst. SAD Platform 170 in an embodiment can include a Risk-by-Association analyzer that provides instructions and logic for operating circuitry which can run a probabilistic risk model to generate a risk-by-association analysis scores. In an embodiment, another optional processing module stored at the associated computer memory 150, and in an aspect as part of the SAD Pipeline Platform 170, is a pattern determination module or model that employs logic and instructions for detecting any data patterns indicative of suspicious activity or behavior in the transaction network that is indicative of criminal and/or fraudulent activity. SAD Platform/Module 170 can further include and invoke supervised (or unsupervised) machine learning (ML) techniques through, for example, ML Model 175, for detecting suspicious activity indicative of criminal activity, e.g., fraud, as known in the art, e.g., supervised learning using a regression model to predict a value of input data (classification) and unsupervised learning (clustering) techniques. Based on features and metadata relating to a party, transactions, claims, environmental data, industry data, location data, other data, and changes to the data that are captured, techniques employing Hidden Markov Models or Artificial Neural Networks may alternatively or additionally be employed to compute a risk associated with a particular party, a transaction, a claim, and/or changes in data states.

In an embodiment, SAD Pipeline Platform 170 includes an optional graph and build module/model 172, e.g., in memory 150, and provides instructions and logic for operating circuitry to form/build graphs, e.g., relationship networks, for use in producing alerts and accessing risk, and/or read data from graphs. Graph build module 172 is shown as included within the SAD Pipeline Platform 170 but can be a separate module/model from the SAD Pipeline Platform 170. Other modules or models can include rules model. Further details and explanation of the SAD Pipeline Platform 170 is discussed below, and the SAD Pipeline Platform 170 is not limited to the modules or models discussed above and any number of models can be used in the SAD Pipeline Platform 170. In an aspect, the ingestion module 165 would load the received input data, the SAD Pipeline Platform 170 determines from the input data, which may, for example, be party data, account data, transaction data, claims data, industry data, geographical data, and other data, including metadata, whether to issue an alert. In most instances, large amounts of data are input and processed by the data ingestion module 165.

Memory 150 optionally includes a supervisory program having instructions for configuring the computing system 100 to call one or more, and in an embodiment all, of the program modules and invoke the suspicious activity detection (SAD) pipeline operations of the SAD Pipeline Platform 170 in risk assessment tool 100. In an embodiment, the supervisory program calls methods and provides application program interfaces (APIs) for running SAD Pipeline Platform 170 for generating a suspicious activity detection (SAD) pipeline for producing SARs and/or alerts using the data ingested by the data ingestion module 165.

At least one application program interface (API) 195 is invoked in an embodiment to receive input data from an "analyst", e.g., a domain expert trained in finance/financial matters particularly in the context of detecting criminal and/or fraudulent activity. Via API 195, the analyst receives SARs and/or alerts. The analyst reviews the alert and, in an embodiment, can provide feedback information to either escalate or close the investigation of a particular party, transaction, etc. depending on the risk. Further investigation can lead to the issuance of a suspicious activity report (SAR).

In an embodiment, computing system and/or risk assessment tool 100 can also include a system, platform, computer program product, and/or computer programming module 180 to optimize the suspicious activity detection (SAD) pipeline based upon the desired Key Performance Indicators (KPIs). In one or more embodiments, the Suspicious Activity Detection (SAD) Pipeline Optimizer Module 180 is configured to capture requirements for the suspicious activity detection (SAD) pipeline, and in an aspect to understand the dependency of different pre-processing, filters, data transform functions, models, and/or steps involved in the suspicious activity detection (SAD) pipeline. In one or more embodiments, the Optimizer 180 generates one or more configurations for candidate runs, performs one or more simulations for the candidate configurations, and captures the key performance indicators (KPIs) for the candidate runs and simulations. The Optimizer 180, according to an embodiment, compares the reported KPIs for the various candidate runs and/or simulations against the defined/desired KPIs and in an aspect makes a recommendation on possible pipeline configurations to meet the desired KPIs.

The Suspicious Activity Detection (SAD) Pipeline Optimizer Module 180 in one or more embodiments provides instructions and logic for operating circuitry to optimize the suspicious activity detection (SAD) pipeline configuration. According to one or more approaches, optimizing the SAD pipeline can include, but is not limited to, re-ordering of steps, reconfiguring and/or adjusting tasks (filtering, transform functions, data processing, and/or models), identifying "hot spots" (e.g., filters, transform functions, models, tasks that could not be optimized), and/or identifying models, data processing tasks, and/or feature engineering steps that can be removed without significant compromise to the desired/defined KPIs.

In an embodiment, SAD pipeline Optimizer Platform 180 includes an optional graph and build module/model 182, e.g., in memory 150, and provides instructions and logic for operating circuitry to form/build graphs for use in optimizing the suspicious activity detection pipeline, and/or read data from graphs. Graph build module 182 is shown as included within the Optimizer Platform 180 but can be a separate module/model from the Optimizer Platform 180. Other modules or models can include rules model. Further details and explanation of the Optimizer Platform 180 is discussed below, and the Optimizer Platform 180 is not limited to the modules discussed below and any number of modules can be used in the Optimizer Platform 180. In an aspect, the ingestion module 165 would load the received input data to the SAD Pipeline Module 170, the SAD Pipeline Module 170 would configure a suspicious activity detection (SAD) pipeline to generate alerts, Optimizer Platform 180 would receive the desired KPIs and the pipeline to be optimized (and optionally the fine tune options), and the Optimizer Platform 180 determines from the desired KPIs and inputted pipeline, whether and how to reconfigure, adjust, and/or remove preprocessing tasks to optimize the suspicious activity detection (SAD) pipeline (e.g., generate revised SAD pipeline) for the desired/defined KPIs.

Figure 2:
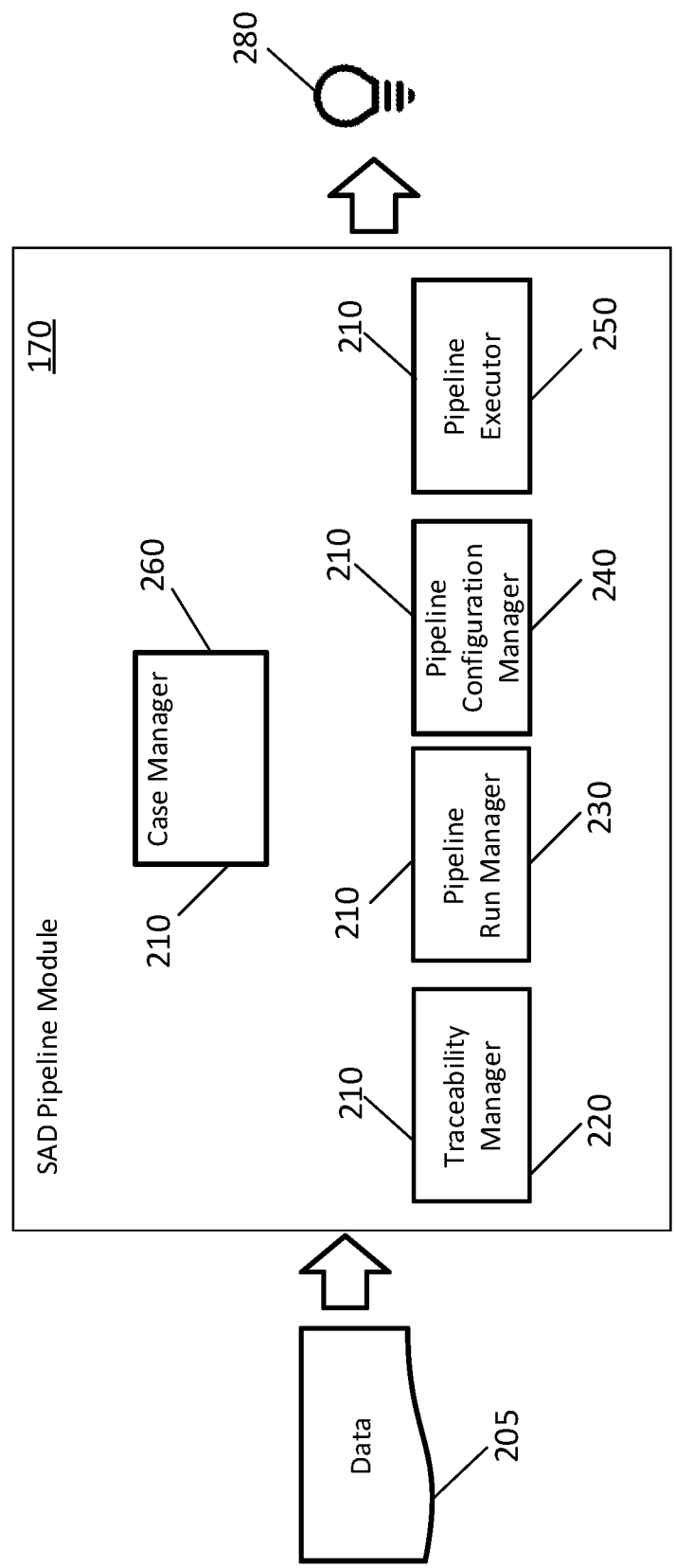
FIG. 2 schematically illustrates an overview of a module having functional units configured to generate a suspicious activity detection (SAD) pipeline to output alerts according to an embodiment of the present disclosure.

FIG. 2 discloses further details about the SAD Pipeline Module 170, sometimes also referred to as a SAD Pipeline Generator or SAD Pipeline Generator Framework 170, that is designed and configured to generate a suspicious activity detection (SAD) pipeline that creates one or more alerts 280. For purposes of clarity FIG. 2 discloses functional units 210 for the Module 170 while eliminating some of the details, specifics, and features disclosed in system 100 in FIG. 1. The functional units 210, and/or processing units associated with the functional units 210, contain instructions and/or logic for operating circuitry to perform the respective functions and operations of the functional units. For example, the functional units 210 contain instructions and/or logic executable by circuitry, for example in a processor, computer, server, etc., to perform one or more of the process steps performed by the respective functional unit 210.

Module 170 in the embodiment of FIG. 2 discloses functional units 210 including Traceability Manager 220, Pipeline Run Manager 230, Pipeline Configuration Manager 240, Pipeline Executor 250, and Case Manager 260. Pipeline Configuration Manager 240 configures and maintains a suspicious activity detection (SAD) Pipeline 300 (See FIG. 3) by, for example, determining what models to call, what data 205 to use, and how to use the data. The pipeline configuration can be captured in a table or as a JSON object. Pipeline Configuration Manager 240 also maintains the revisions of the pipeline configurations such as, for example, what version, who modified/created the SAD pipeline, and when it was modified/created. Pipeline Configuration Manager 240 further maintains details of the pipeline such as input data, the pipeline flow, which filters are used and their versions, which transform functions are used and their versions, which models are used and their versions, which code/module are used and their versions.

The Pipeline Executor 250 executes the suspicious activity detection (SAD) pipeline, including reading the pipeline configuration for a given pipeline and its version and executes the steps in the pipeline. Pipeline Executor 250 updates the execution pipeline run configuration and runs an Execution Pipeline 300 (See FIG. 3) task-by-task to generate and output alerts 280. The Pipeline Run Manager 230 maintains the run details, e.g., for each pipeline. The Pipeline Run Manager 230 manages and tracks what programs/ models are run, including when and what is run each time a pipeline run is executed, such as, for example, when the pipeline run started and completed, and the outcome or result of the run. The Pipeline Run Manager 230 knows the runtime information of any given pipeline and can be used to find which runs are impacted for a given change. The Traceability Manager 220 maintains the traceability of different artifacts in the system. The Traceability Manager 220 can help to identify the pipeline runs for a given alert by tracing the alerts and what models, programs, filters, data, transform functions, insights and/or events were used to generate the alerts 280. The Case Manager 260 in an embodiment is typically used by a user or analyst to review the alerts generated by the system. If the alert is suspicious enough, in an aspect it can be moved to an investigation queue, or if the alert is a false positive, the analyst or supervisor can close the case.

The Module 170 uses the functional units 210 to generate and run the SAD pipeline to prepare alerts 280 based upon data 205 ingested and/or received into the system 200. For example, the Module 170 receives additional data on a periodic basis, such as for example every evening. The Module 170 through input from an analyst or other user, or optionally as part of a program, selects programs or models to run in order to generate alerts 280. The module 170 to generate the alert 280 can take many forms and can have more or less functional units 210 than described in connection with FIG. 2. The Module 170 can be run to generate alerts on a periodic basis, such as, for example at predetermined times, and/or manually by a user, immediately or any desired time.

Figure 3:
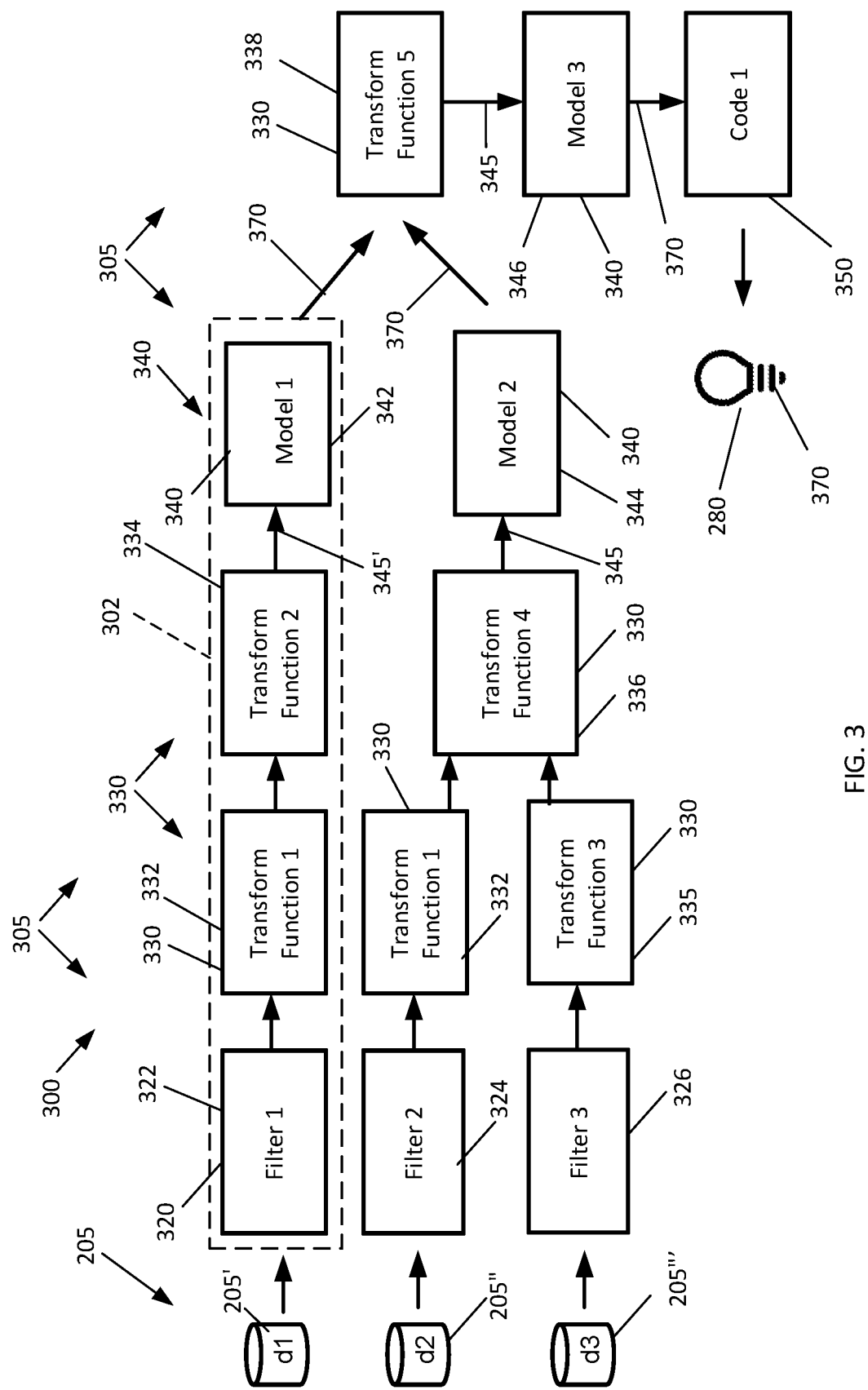
FIG. 3 illustrates a schematic block diagram of a suspicious activity detection (SAD) pipeline according to an embodiment of the present disclosure.

FIG. 3 illustrates a suspicious activity detection (SAD) (e.g., fraud detection) execution pipeline 300 generated and/or created by suspicious activity detection (SAD) pipeline module 170. Pipeline 300 in an embodiment includes receiving and/or ingesting data 205, illustrated as data subset 205' (d1), data subset 205" (d2), and data subset 205'" (d3) in FIG. 3, where for example d1 data subset 205' represents data, d2 data subset 205" represents parties, and d3 data subset 205'" represents incidents or claims. It can be appreciated that the amount of data can and likely is much larger and numerous than the data 205 illustrated in FIG. 3. The detection pipeline 300 can include one or more tasks 305, for example one or more filters 320, one or more Transform Functions 330, one or more Models 340, and one or more Code Units 350 to process the data 205 and produce, generate, and/or output an Alert 280. The detection pipeline 300 illustrates a flow that takes data as an input and performs a number of tasks 305 to process the data to generate an output 280, which can optionally include one or more insights 370.

Pipeline 300 includes one or more filters 320, illustrated as Filter 1 (322), Filter 2 (324), and Filter 3 (326) in FIG. 3, that are applied to the data 205, e.g., to data d1 (205'), data d2 (205"), and data d3 (205'"). Filters 320 process the data 205 or data subsets (e.g., 205'), for example, by filtering rows and columns, to obtain the desired data or data subsets in, for example, the desired format. Different filters 320 can be applied to different data 205 as shown in FIG. 3, the same filter 320 can be applied to different data, or the same filter 320 can be applied to different data. The detection pipeline 300 can apply one or more transform functions 330 which further process and transform the data. One example of a transformation function 330 can be an "aggregate" function, which aggregates the physical damages or injury bills against a particular claim. Another example can be a simple function which computes whether the loss date is a weekday or a weekend, and whether during business hours or after business hours. In pipeline 300, the Transform Functions 330 are Transform Function 332 (Transform Function 1), Transform Function 334 (Transform Function 2), Transform Function 335 (Transform Function 3), Transform Function 336 (Transform Function 4), and Transform Function 338 (Transform Function 5). More or less Transform Functions 330 can be used in detection Pipeline 300. Different incident models 340 can be applied in detection pipeline 300. The one or more filters 320 and one or more Transform Functions 330 generate one or more feature sets 345 that are input and/or submitted to the one or more models 340. The one or more features or feature sets 345 are data 205 that has been filtered, selected, and transformed into a form for use by the selected model 340. In other words, the various models 340 desire and/or require certain data in a certain format in order to run and generate an output. In execution pipeline 300, for example, the feature 345' (e.g., feature 1) output from Transform Function 334 is fed into Model 342 (Model 1).

The models 340, also referred to as programs 340, in one or more embodiments receive input as feature set 345 and will output or generate, depending upon the amount of processing performed by the model, insights 370, alerts 280, and/or values (data) that can, for example, be further processed to create insights 370 or alerts 280. In an embodiment, the output from the Module 170 and/or detection pipeline 300 is an alert 280, and the alert 280 in one or more aspects is output directly from the one or more models 340. Additionally, or alternatively, the output from the one or more models 340 can be one or more insights 370 that are used to generate one or more alerts 280. The models 340 can be, for example, a risk-by-association analyzer, a pattern determination model, a rules model, a machine learning (ml) model, etc. More or less models 340 are contemplated, and pipeline 300 is illustrated with three models 340, e.g., Model 342 (Model 1), Model 344 (Model 2) and Model 346 (Model 3).

In a further embodiment, the one or more models 340 can produce values (data) used to replace variables in a narrative template to create insights 370, and/or values that can be used to generate an alert 280. That is, based upon the model output, the detection pipeline 300/Module 170 (e.g., a Transform Function 330 and/or a further model 340) can replace the variables in a narrative and provide the resulting narrative as an insight 370. For example, after applying the one or more models 340 the data output from the models(s) 340 may undergo further processing and manipulation by further transform function(s) 330, and by one or more models 340, to produce one or more insights 370. In one or more embodiments, because the model output is technical output and users of the system typically respond to text language, e.g., sentences, that they can understand, the model output can be run through a further optional Transform Function and/or a further model to construct a narrative referred to as an insight 370. In pipeline 300, for example, the output from Models 342 and 344 are received by Transform Function 338 which further processes the data for insertion into a narrative where the output from Transform Function 338 is received by Model 346 that inserts the values from Transform Function 338 into the narrative and Model 346 outputs one or more insights 370. As a further example, a model 342 returns two values [Cluster A, 10] where A is the cluster ID and 10 is the number of frauds in the cluster. Model 342 or another Model can place or substitute the values from model 342 into a narrative template to produce an insight 370. So where the narrative template is defined as "Party <party_id> is in Cluster <cluster id> which contains <number_of_fraud_parties> parties", the model 342 or another model will take the values and produce the insight, "Party A is in cluster A which contains 10 fraud parties" as an insight 370 output by model 342 or another model.

Optional Code 350 in pipeline 300 may be applied to further convert the data. For example, code 350 can be a look-up table to score the output of the case. Model 346 (Model 3) in pipeline 300 can output a numeric score or value and Code 1 350 can determine if the numerical score or value is above a threshold, and if so can generate or output an alert 280. It should be recognized that the output of the pipeline 300, or the model 340 may be in the form of "low" risk, "medium risk", or "high" risk, but it should be recognized that the output can be in other forms or formats. In one or more embodiments, input data 205 is fed into the module 170, and in an embodiment into detection pipeline 300, where the input data 205 is converted into features 345 that are fed into one or more models 340 where in one or more aspects the one or more models 340 generate an output as one or more insights 370, and one or more insights can be used to generate an alert 280.

It should be recognized that the Detection Pipeline 300 can include one or more execution pipelines, or sub-branches 302 that perform one or more tasks 305. For example, Filter 322 (Filter 1), Transform Function 332 (Transform Function 1), Transform Function 334 (Transform Function 2), and Model 342 (Model 1) illustrates detection pipeline 302. Each sub-pipeline 302 can have different task units that undergo different tasks 305, e.g., different filters, different transform functions, and/or different models, but can also share filters, transform functions, models, and data. For example, in the insurance industry, the SAD Pipeline Module can produce an auto insurance pipeline, a worker's compensation pipeline, a property pipeline, and/or a medical provider pipeline, to name just a few. Each pipeline will take or use different data and perform different tasks 305 to process the data differently to detect/identify potential suspicious activity. For example, the auto pipeline takes all auto insurance claims as input data and the worker's compensation pipeline is fed with worker's compensation claims.

An analyst typically reviews the alert 280 output by the SAD pipeline 300 to determine how to proceed, and, in particular, typically reviews the insights 370 and/or events that lead to the alert 280 being generated in the particular case in order to determine how to proceed. The alert 280 typically relies upon one or more insights 370, and the alert or report is typically presented with the insights 370 which form the basis for the alert 280. For example, insight 1 could be that the average number of transactions has changed by twenty percent (20%); insight 2 could be that the customer is part of a high-risk cluster which has a number of known frauds; insight 3 could be that the transactions are associated with a high-risk geographic zone; and insight 4 could be that there was extended inactivity in the account before the recent transactions. The SAD Pipeline Generator Module 170 for example can have a Case Manager 260 that contains the alerts 280 and/or insights 370, and the user or analyst opens the case manager program 260 and reviews the alerts 280, insights 370. The analyst reviews the alert 280 and/or insights 370, and determines how to proceed, including for example to close the alert 280 if the alert is believed to be a false positive, or if it is believed that there is likely some fraud and needs further investigation the case can be escalated to "investigation". In instances the analyst can decide whether to bring the alert 280 to a supervisor or manager to determine what actions to take.

Often data science teams investigating suspicious activity and building SAD pipelines, focus on the overall performance of the suspicious activity detection (SAD) pipeline to maximize the F1 score, where the F1 score is an indicator of how well the model is performing (maximizing the probability of the pipeline). Instead of maximizing the F1 score, in one or more embodiments the pipeline is optimized to account for multiple, preferably all the, desired Key Performance Indicators (KPIs), e.g., the time to complete, amount of CPU usage, amount of memory usage, and/or F1 score. In one or more embodiments a SAD pipeline optimizer 180 takes into account and maximizes the SAD pipeline for multiple KPIs.

Figure 4:
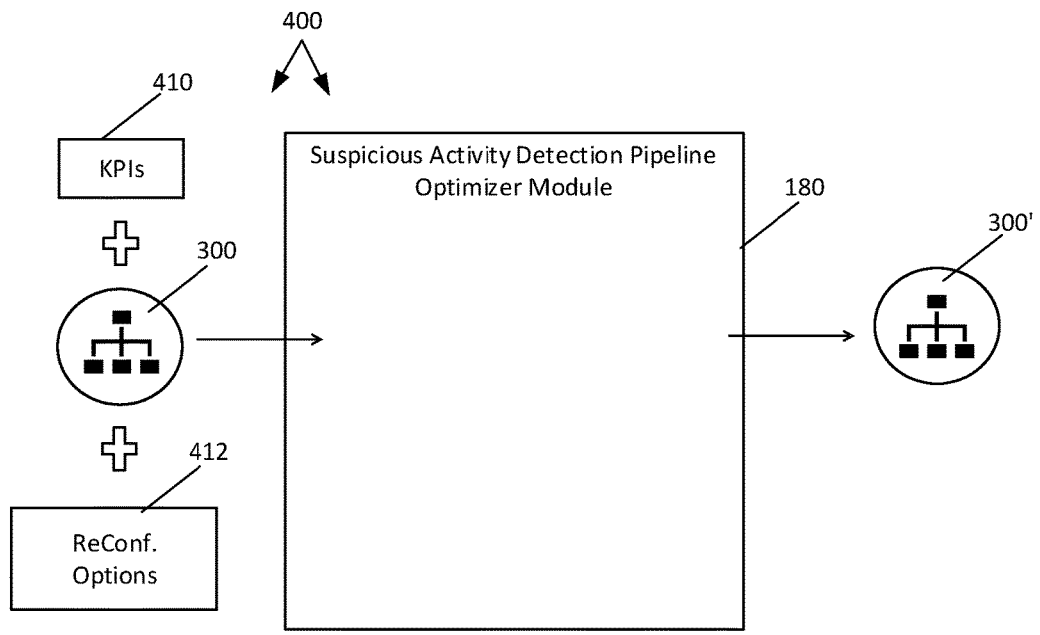
FIG. 4 schematically illustrates an overview of a system to optimize a suspicious activity detection (SAD) pipeline in accordance with an embodiment of the present disclosure.
Figure 5:
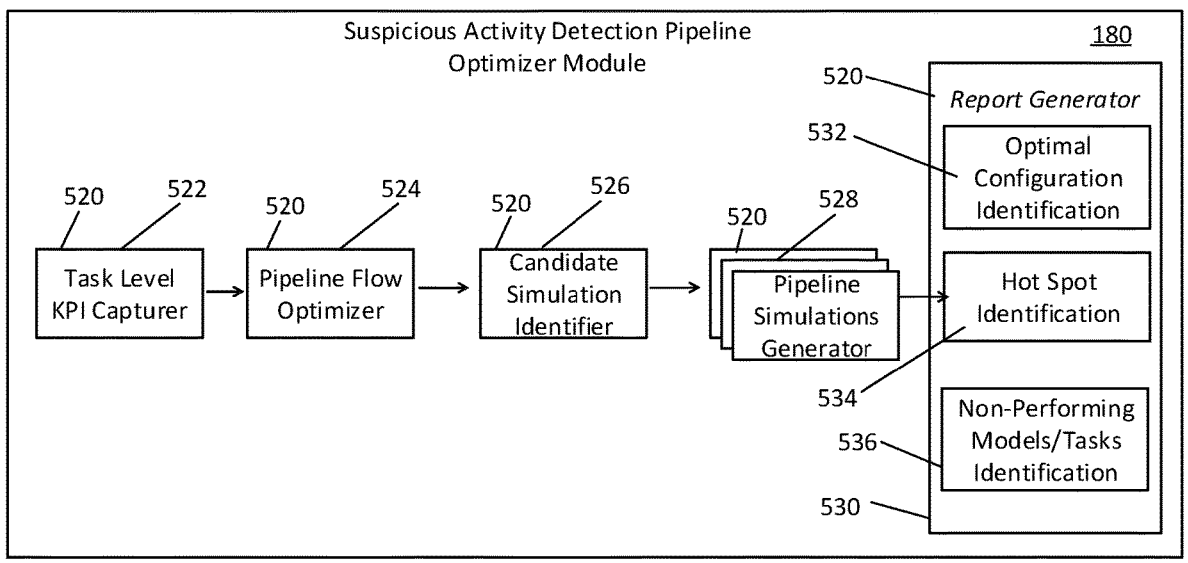
FIG. 5 illustrates a block diagram of a Suspicious Activity Detection (SAD) Pipeline Optimizer Module for optimizing a suspicious activity detection (SAD) pipeline for desired KPIs according to an embodiment of the present disclosure.

FIG. 4 diagrammatically illustrates an overview of a system 400 that receives desired key performance indicators (KPIs) 410, a SAD pipeline 300, and optional reconfiguration and readjustment (e.g., fine tune) options 412 for the SAD pipeline 300, as inputs into Suspicious Activity Detection (SAD) pipeline optimizer module 180 to provide/produce an optimized SAD pipeline 300' for the desired KPIs 410. FIG. 5 discloses further details about the suspicious Activity Detection (SAD) Pipeline Optimizer Module 180, sometimes also referred to as an Optimizer System 180, Optimizer Governance Framework 180, and/or Optimizer Module 180, that is designed and configured to optimize a SAD pipeline for desired KPIs, e.g., can reconfigure the SAD pipeline by adjusting, changing, removing, and/or re-ordering, tasks, filters, transforms, models, parameters, etc. Key Performance Indicators (KPIs) are generally abstracted as "resource", "time", and "quality", where "resource" can be measured as CPU and/or memory (RAM or disk space), "time" can be measured as total time to complete the job (or task), and "quality can be measured as accuracy of output, e.g., F1 score. Key Performance Indicators (KPIs) can be defined and/or measured at the global pipeline level or at the task lever, e.g., for Model 1, Model 2, etc.

For purposes of clarity, FIG. 5 discloses functional units 520 for the Optimizer Module 180 while eliminating some of the details, specifics, and features. The functional units 520, and/or processing units associated with the functional units 520, contain instructions and/or logic for operating circuitry to perform the respective functions and operations of the respective functional units 520. For example, the functional units 520 contain instructions and/or logic executable by circuitry, for example in a processor, computer, server, etc., to perform one or more of the process steps performed by the respective functional unit 520.

Module 180 in the embodiment of FIG. 5 includes Task Level KPI Capturer 522, Pipeline Flow Optimizer 524, Candidate Simulation Identifier 526, Pipeline Simulations Generator 528, and Report Generator 530. Task Level KPI Capturer 522 performs simulation to understand the KPI values at the task level, e.g., the resource requirements, time requirements, and effect on the accuracy (F1 score) for each task 305 (e.g., data filter tasks, data transform tasks, and/or model tasks) in the detection pipeline 300. The Task Level KPI Capturer 522 in an embodiment scores the tasks 305 in the pipeline 300 against the pipeline KPIs. That is the Task Level KPI Capturer 522 captures and/or records for each task 305 the various KPIs utilized by that particular task 305. For example, the time to run, use of resources (CPU/memory), and/or effect on model accuracy (F1 score) is recorded for each task 305. The KPIs for each task can be recorded in a database, chart, or other format, preferably in a manner that is easily obtainable and ready to use.

The Pipeline Flow Optimizer 524 optionally reorganizes the steps/tasks to optimize the pipeline run. For example, the Pipeline Flow Optimizer 524 could convert parallel tasks to sequential tasks or convert sequential (serial) tasks in the SAD pipeline to parallel tasks based upon the operations performed in the pipeline 300. In an aspect, the Pipeline Flow Optimizer 524 looks at the dependencies of the pipeline and tries to optimize the pipeline flow by, for example, converting serial tasks to parallel tasks to lessen the time required to process data in the pipeline 300. For example, if a first task can be processed independently of a second task, e.g., the input of the second task is not dependent upon the output of the first task, then the second task can be performed parallel with or before the first task, in addition to being performed after the first task. These optional reorganizations, reconfigurations, and/or readjustments performed by the Pipeline Flow Optimizer 524 can be referred to as fine-tune options or fine tune variations. The fine tune variations can be optionally applied by the Pipeline Flow Optimizer 524 when optimizing the pipeline.

Candidate Simulation Identifier 526 computes and determines the candidate pipeline configuration(s) for simulation. In one or more embodiments, the candidate pipeline configurations identified by the Candidate Simulation Identifier 526 utilizes the information collected by the Task Level KPI Capturer 522 to determine the candidate pipelines likely to have the most success by looking at the KPI values recorded for each task. For example, the Candidate Simulation Identifier 526 can determine which tasks are the most resource intensive (take the most CPU, most memory, and/or most time to run) and look to reconfigure and/or remove those tasks. The Candidate Simulation Identifier 526 can also determine which tasks have the least effect on the accuracy score (F1 score) and look to reconfigure and/or remove those tasks. In an embodiment, the Candidate Simulation Identifier 526 can identify the top pipeline candidates based upon information obtained by the Task Level KPI Capturer 522, and, in an aspect, can identify the top fifty, hundred, or some other threshold or percentage of candidate pipelines. In another embodiment, the Candidate Simulation Identifier 526 can use a brute force method of determining and/or identifying a matrix of most every conceivable variation of the pipeline as a candidate pipeline.

Pipeline Simulation Generator 528 runs the simulation for each candidate pipeline identified in the Candidate Simulation Identifier 526. During the simulations run for each pipeline identified in the Candidate Simulation Identifier 526 by the Pipeline Simulation Generator 528, various parameters, including for example resource usage, time to run, F1 score, and KPIs at the task level as well as the pipeline level are captured and recorded.

Report Generator 530 analyzes the simulation results from the Pipeline Simulation Generator 528 and generates a report. The Report Generator 530 includes Optimal Configuration Identifier 532, Hot Spot Identifier 534, and Non-Performing Tasks (Models) Identifier 536. Optimal Configuration Identifier 532 identifies the optimal SAD pipeline for meeting the desired KPIs among the various candidate SAD pipelines. Hot Spot Identifier 534 identifies tasks that could not be optimized and which in an aspect negatively affect and count against one or more the desired KPIs. For example, the Hot Spot Identifier 534 could identify a task that consumes 10% of the desired CPU usage, and 15% against the desired time to complete. Non-Performing Tasks Identifier 536 identifies tasks that do not contribute to the KPIs, e.g., the tasks can be removed from the SAD pipeline and the SAD pipeline would still meet the KPIs. The tasks identified by the Non-Performing Tasks Identifier 536 according to one approach could be considered redundant tasks.

Figure 6:
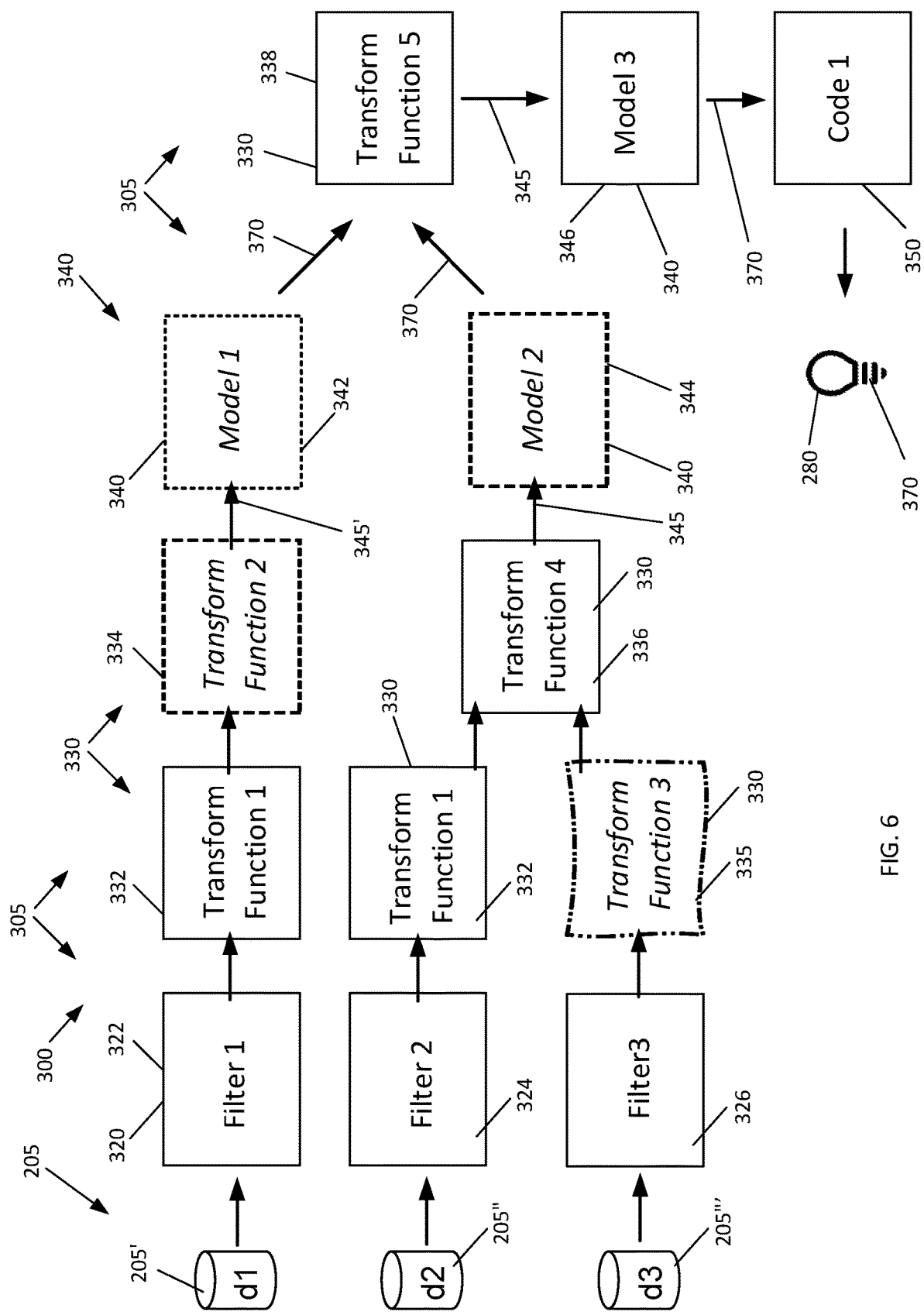
FIG. 6 illustrates a schematic block diagram of the suspicious activity detection (SAD) pipeline of FIG. 3 undergoing optimization according to an embodiment of the present disclosure.
Figure 7:
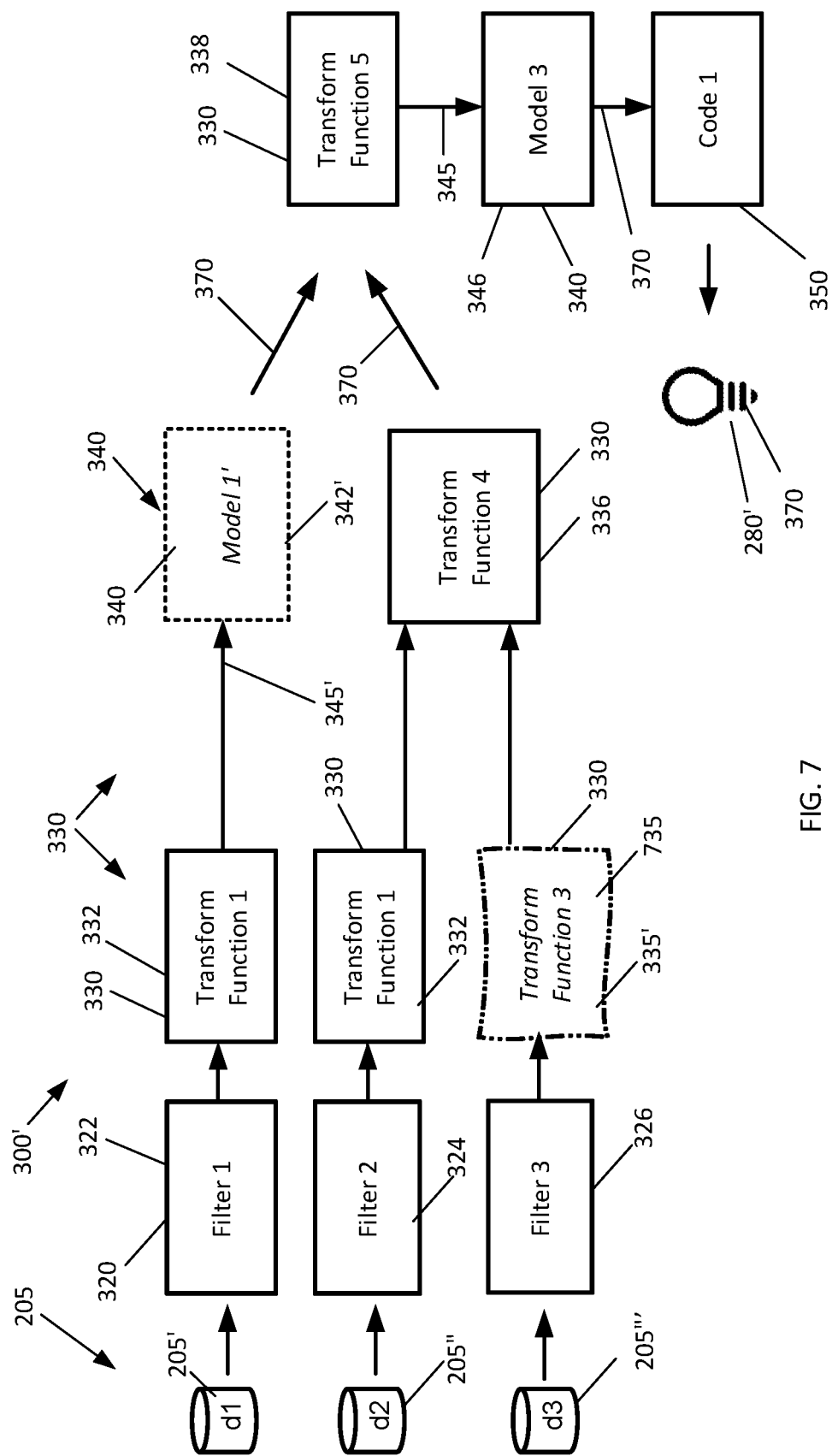
FIG. 7 illustrates a schematic block diagram of an optimized suspicious activity detection (SAD) pipeline of FIG. 3 according to an embodiment of the present disclosure.

FIGS. 6-7 illustrate schematic block diagrams of a pipeline 300 that has been generated by SAD Pipeline Generator Module 170 that has been fed into the SAD Pipeline Optimizer 180 with the desired KPIs, and the pipeline 300 is optimized by adjusting, modifying, reconfiguring, updating, reordering, and/or removing tasks 305 to provide revised SAD pipeline 300'. As shown in FIG. 6 Transform Function 334 (Transform Function 2) and Model 344 (Model 2) are identified for removal as they have negligible effect on improving F1 score for the pipeline 300 and consume resources and expend KPI capital. The configuration of Model 342 is identified for a configuration update in FIG. 6, and Transform Function 335 (Transform Function 3) has been identified as a hot spot as variations did not result in optimizing the SAD pipeline 300 or the task performed at Transform Function 335. FIG. 7 is a schematic block diagram of FIG. 6 illustrating the optimized SAD pipeline 300' where Transform Function 334 and Model 344 have been removed, the configuration of Model 342 has been updated to Model 342', and Transform Function 335 has been identified as a hotspot 335'. Hotspot 335' in an embodiment indicates that task 335' was not able to be optimized and is still expensive in the SAD pipeline 300' in terms of resources (KPIs) consumed. In an aspect, task 335' is tagged as a hotspot so the data scientists and/or user of the system can review the hotspot task 335'.

Figure 8:
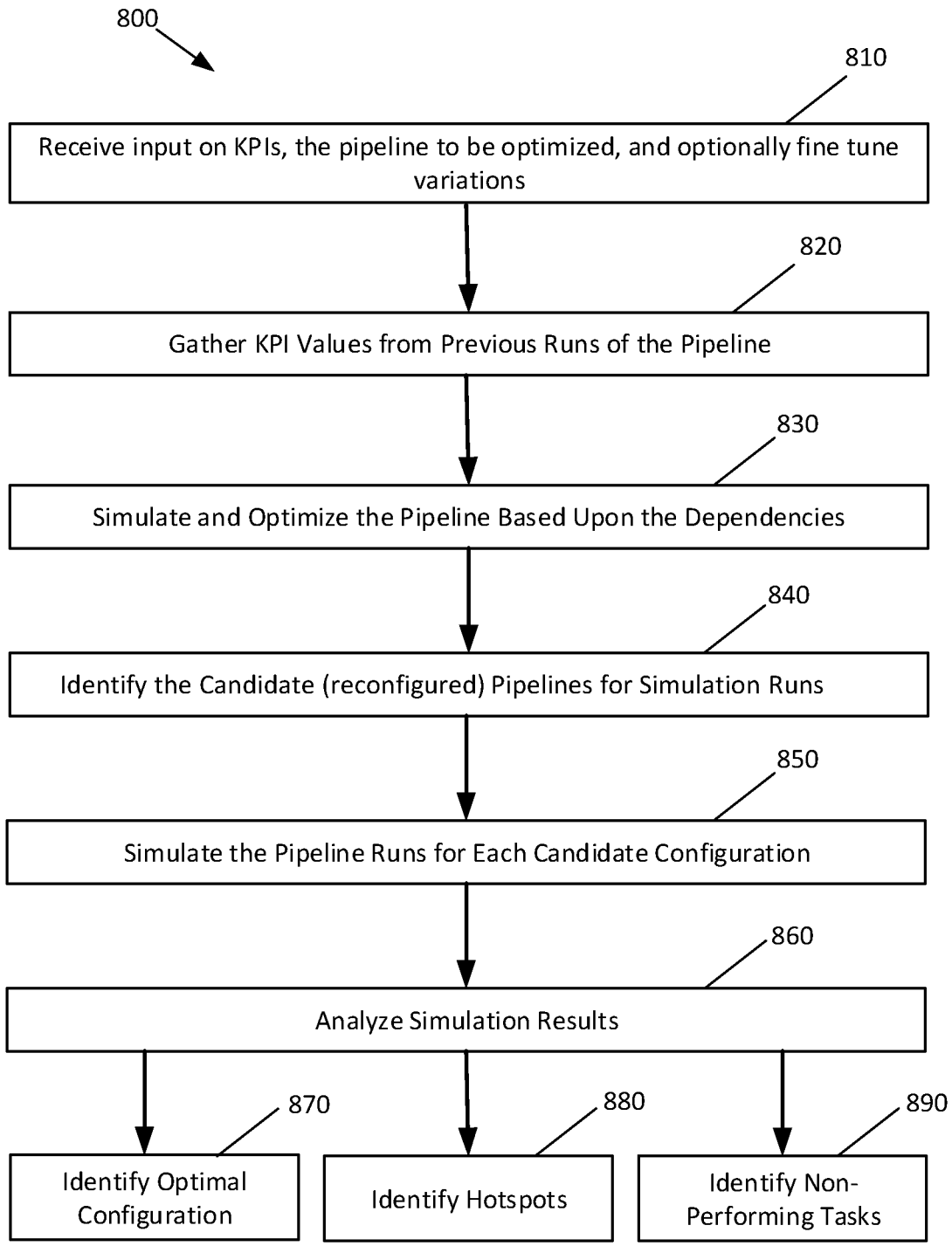
FIG. 8 illustrates a diagrammatic flowchart of a method of optimizing a suspicious activity detection (SAD) pipeline according to an embodiment of the present disclosure.

FIG. 8 is an exemplary flowchart in accordance with one embodiment illustrating and describing a method 800 of optimizing a pipeline for detecting suspicious activity based upon the desired Key Performance Indicators (KPIs). While the method 800 is described for the sake of convenience and not with an intent of limiting the disclosure as comprising a series and/or a number of steps, it is to be understood that the process 800 does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

The method 800 in one or more embodiments includes a data analytics pipeline for receiving data and detecting suspicious activity or behavior, and in an aspect in response to detecting suspicious activity generating an alert. The data analytics suspicious activity detection (SAD) pipeline can be generated in an embodiment by a data analytics system and/or platform, e.g., SAD Pipeline Module 170. The method 800 includes in an embodiment at 810 receiving the data analytics (SAD) pipeline to be optimized, including its name, and the desired KPIs for the SAD pipeline. The desired KPIs, for example, can be the time for the SAD pipeline to run, the amount of CPU and/or memory, and/or the F1 score. The KPIs can be expressed and input as values or ranges, including minimums and maximums. The desired KPIs are typically received from the client and input into a data analytics system and/or platform, e.g., SAD pipeline Optimizer 180, to optimize the SAD pipeline. For example, a client may desire the SAD pipeline to have a run time of less than 8 hour and have an F1 score better than 0.76. Other KPIs values and/or ranges are contemplated. The SAD pipeline is typically generated by a module, e.g., SAD Pipeline Module 170, in a system, and received by an optimizer module, e.g., SAD Pipeline Optimizer 180. In one or more embodiments, a user inputs the name of the SAD pipeline to be optimized and the system and/or platform, e.g., SAD Pipeline Optimizer 180, can retrieve the pipeline to be optimized.

Fine tune variations can optionally be inputted at 810. These fine tune variations (or options) can in an aspect be at the task level. In one or more embodiments, the fine tune variations, include reorganizing the pipeline tasks, for example, changing the order of steps depending upon their dependencies. For example, changing parallel steps to sequential steps, or changing serial steps to parallel steps. At 810, the fine tune variations can optionally be input into a system or platform.

At 820, the KPI values from previous runs of the pipeline to be optimized are retrieved and/or gathered. In one or more embodiments, the KPIs are retrieved from the pipeline run manager, e.g., Pipeline Run Manager 230. The pipeline KPIs from the previous runs is generally captured by the Task Level KPI Capturer 522. At 830, optionally the fine tune variations are applied to simulate and optimize the pipeline based upon the pipeline dependencies. In an aspect optimizing the pipeline flow is performed in a Pipeline Flow Optimizer 524. At 830, the ordering of the SAD pipeline tasks can be reconfigured, e.g., serial tasks can be converted to parallel tasks and vice-versa. Block 830 is an optional step and is not necessary to be applied in this manner at this stage of optimizing the SAD pipeline.

At 840, identify the candidate SAD pipeline configurations for simulation runs. That is, at 840, candidate SAD pipelines that have different configurations are identified for simulation runs to determine the effect the changes have on the KPIs for the different SAD pipeline configurations. In one or more embodiments, the KPIs captured at the task level is a starting point to identify the different SAD pipeline configurations that could have success in optimizing the SAD pipeline. For example, tasks that had an outsized effect, e.g., a large or small effect, on the KPI of the pipeline and/or task are identified, and candidate SAD pipeline configurations can be derived from changes based upon that information. Tasks that consumed large amounts of CPU, memory, and/or run time for example can be targeted for reconfiguration, while tasks that have a small effect on the F1 score can likewise be targeted for reconfiguration, e.g., removal from the pipeline.

In this manner, at 840 a number of candidate SAD pipelines can be identified for simulations runs for determining the optimized SAD pipeline for the desired KPIs. In one or more embodiments, a number "N" candidate SAD pipelines that are reconfigured from the original SAD pipeline can be identified for simulation runs based upon using the KPIs gathered from the original pipeline simulation run and using that information to attempt to identify those SAD pipeline configurations likely to have the greatest effect on optimizing the SAD pipeline. In one or more embodiments, a brute force model can be used to create a matrix of all possible SAD pipelines as a manner of identifying at 840 candidate SAD pipeline configurations for simulation runs.

At 850 the candidate SAD pipeline configuration runs identified at 840 are simulated. In one or more embodiments, the KPIs for each simulation run of each SAD pipeline reconfiguration are captured and/or recorded. The KPI information for each candidate SAD pipeline can be recorded on the task level and/or global pipeline level. At 860 the simulation results, e.g., the simulation runs of the candidate SAD pipeline reconfigurations, are analyzed. For example, analysis of the simulation results at 860 can identify the optimal SAD pipeline configuration at 870, and/or identify hotspot tasks at 880, and/or identifying non-preforming tasks at 890. The non-performing tasks can be removed and/or targeted for removal from the SAD pipeline. In one or more embodiments, analyzing the simulation runs at 860 can result in generating a report, and the report can identify the optimal SAD pipeline configuration, identify the hotspots, and/or the non-performing tasks.

Figure 9:
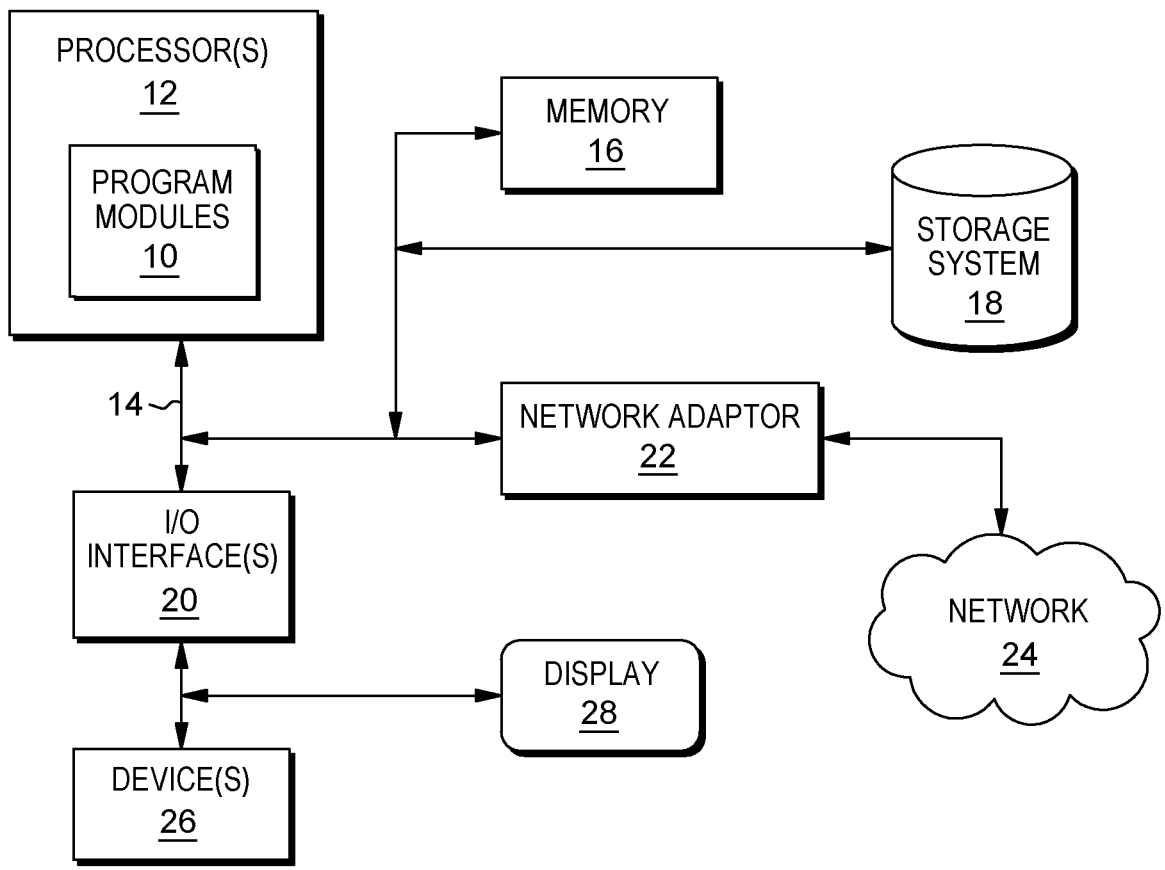
FIG. 9 illustrates yet another exemplary system in accordance with the present disclosure.

FIG. 9 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by the computer system, and it may include both volatile and non-volatile media, removable and non-removable media.

Memory 16 (sometimes referred to as system memory) can include computer readable media in the form of volatile memory, such as random-access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of optimizing an electronic data analytics pipeline that uses electronic input data to generate an output prediction, the computer implemented method comprising by one or more processors:
    identifying an existing electronic data analytics pipeline for optimization to produce an optimized electronic data analytics pipeline, wherein the existing electronic data analytics pipeline receives electronic data and comprises one or more tasks performed on the electronic input data to process the electronic data, one or more predictive models to receive electronic feature sets, and at least one of a processing group consisting of: one or more filters to process at least a portion of the electronic input data, one or more transform functions to process at least a portion of the electronic input data or electronic output of the one or more filters, and combinations thereof to produce the electronic feature sets, and wherein the one or more predictive models comprise at least one of a models group consisting of: a risk-by-association analyzer, a pattern determination model, a rules model, a regression analyzer, a clustering model, a machine-learning model, an ensemble model, a Hidden Markov Model, an Artificial Neural Network, and combinations thereof, and wherein the existing electronics data analytics pipeline determines what predictive models to use, what electronic data to use, and how to use the electronic data;
    receiving desired key performance indicator values for the existing electronic data analytics pipeline identified for optimization, the desired key performance indicator values comprising an accuracy score for the existing electronic data analytics pipeline identified for optimization and at least one of a performance group consisting of: time for the existing electronic data analytics pipeline identified for optimization to run, amount of CPU for the existing electronic data analytics pipeline identified for optimization to run, amount of memory for the existing electronic data analytics pipeline identified for optimization to run, and combinations thereof;
    gathering key performance indicator values on a task level from performing the one or more tasks from previous runs of the existing electronic data analytics pipeline identified for optimization;
    identifying one or more hotspot tasks in the existing electronic data analytics pipeline identified for optimization that are not susceptible to improving the existing electronic data analytics pipeline identified for optimization;
    identifying one or more tasks from the existing electronic data analytics pipeline identified for optimization that have no or negligible effect on the existing electronic data analytics pipeline identified for optimization;
    identifying, by using the gathered key performance indicator values on the task level for the one or more tasks from the previous runs of the existing electronics data analytics pipeline identified for optimization, candidate electronic data analytics pipeline configurations for simulation runs, wherein the candidate electronic data analytics pipeline configurations identified for the simulation runs comprise reconfiguring at least one of a reconfiguration group consisting of: the one or more tasks, the one or more filters, the one or more transform functions, the one or more predictive models, and combinations thereof of the existing electronic data analytics pipeline identified for optimization, including removing the one or more tasks from the existing electronic data analytics pipeline identified for optimization that have no or negligible effect on the existing electronic data analytics pipeline identified for optimization;
    create a matrix of candidate electronic data analytics pipeline configurations for simulation runs;
    running simulations of the candidate electronic data analytics pipeline configurations identified for simulation runs;
    recording for each simulation run of each of the candidate electronic data analytics pipeline configurations identified for simulation runs at least two of the desired key performance indicator values on the task level, on a candidate electronic data analytics pipeline configuration level, or both;
    analyzing the simulation runs of the candidate electronic data analytics pipeline configurations based on the at least two of the recorded key performance indicator values on the task level, on a candidate electronic data analytics pipeline configuration level, or both; and
    identifying at least one of the candidate electronic data analytics pipeline configurations as the optimized electronic data analytics pipeline based on the at least two of the recorded key performance indicator values on the task level, on the candidate electronic data analytics pipeline configuration level, or both.

2. The computer-implemented method according to claim 1, further comprising identifying the optimal candidate electronic data analytics pipeline configuration for all the performance group of desired key performance indicators.

3. The computer-implemented method according to claim 1, further comprising applying fine tune variations that reorganize the order of one or more tasks in the existing electronic data analytics pipeline.

4. The computer-implemented method according to claim 1, wherein identifying candidate electronic data analytics pipeline configurations for simulation runs comprises identifying at least one of a task group consisting of: reconfiguring one or more tasks, updating one or more tasks, re-ordering one or more tasks, and combinations thereof.

5. The computer-implemented method according to claim 1, wherein using the gathered key performance indicators comprises identifying a top M tasks that have an outsized effect on one or more of the desired key performance indicators.

6. A computer-implemented method according to claim 1, wherein the candidate electronic data analytics pipeline configurations identified for simulation runs are limited to the top N candidate electronic data analytics pipeline configurations.

7. The computer-implemented method according to claim 1, further comprising converting serial tasks to parallel tasks in the existing electronic data analytics pipeline identified for optimization or vice versa.

8. The computer-implemented method according to claim 1, further comprising determining which tasks have the least effect on the accuracy score on the existing electronic data analytics pipeline identified for optimization and removing or reconfiguring those tasks as part of identifying candidate electronic data analytics pipeline configurations for simulation runs.

9. The method according to claim 1, further comprising capturing the existing electronic data analytics pipeline identified for optimization in a table or as a JSON object.

10. The method according to claim 1, further comprising running the optimized electronic data analytics pipeline to generate the output prediction.

11. A computer programming product comprising a computer readable storage medium having computer readable program instructions that, when executed by at least one hardware processor, configure the at least one hardware processor to:
  identify an existing electronic data analytics pipeline for optimization to produce an optimized electronic data analytics pipeline, wherein the existing electronics data analytics pipeline for optimization receives electronic data and comprises one or more tasks performed on electronic input data to generate an output prediction, one or more predictive models to receive electronic feature sets, and at least one of a processing group consisting of: one or more filters to process at least a portion of the electronic input data, one or more transform functions to process at least a portion of the electronic input data or electronic output of the one or more filters, and combinations thereof to produce the electronic feature sets, wherein the one or more predictive models comprise at least one of a models group consisting of: a risk-by-association analyzer, a pattern determination model, a rules model, a regression analyzer, a clustering model, a machine-learning model, an ensemble model, a Hidden Markov Model, an Artificial Neural Network, and combinations thereof, and wherein the existing electronic data analytics pipeline determines what predictive models to use, what electronic data to use and how to use the electronic data;
  receive desired key performance indicator values for the existing electronic data analytics pipeline identified for optimization, wherein the desired key performance indicator values comprise an accuracy score for the existing electronic data analytics pipeline identified for optimization and at least one of a performance group consisting of: time for the existing electronic data analytics pipeline identified for optimization to run, amount of CPU for the existing electronic data analytics pipeline identified for optimization to run, amount of memory for the existing electronic data analytics pipeline identified for optimization to run, and combinations thereof;
  gather key performance indicator values on a task level for the one or more tasks from previous runs of the existing electronic data analytics pipeline identified for optimization;
  identify one or more hotspot tasks in the existing electronic data analytics pipeline identified for optimization that are not susceptible to improving the existing electronic data analytics pipeline identified for optimization to be optimized;
  identify one or more tasks from the existing electronic data analytics pipeline identified for optimization that have no or negligible effect on the existing electronic data analytics pipeline identified for optimization;
  identify, by using the gathered desired key performance indicator values on the task level for the one or more tasks from previous runs of the existing electronic data analytics pipeline identified for optimization, candidate electronic data analytics pipeline configurations for simulation runs, wherein the candidate electronic data analytics pipeline configurations identified for simulation runs comprise reconfiguring at least one of a reconfiguration group consisting of: the one or more tasks, the one or more filters, the one or more transform functions, the one or more predictive models, and combinations thereof of the existing electronic data analytics pipeline identified for optimization, including removing the one or more tasks from the existing electronic data analytics pipeline identified for optimization that have no or negligible effect on the existing electronic data analytics pipeline identified for optimization;
  create a matrix of candidate electronic data analytics pipeline configurations for simulation runs;
  run simulations of the candidate electronic data analytics pipeline configurations identified for reconfiguration;
  record for each simulation run of each of the candidate electronic data analytics pipeline configurations at least two of the key performance indicator values on the task level, on a candidate electronic data analytics pipeline configuration level, or both; and
  analyze the simulations of the candidate electronic data analytics pipeline configurations based on the at least two of the recorded key performance indicator values on the task level, on the candidate electronic data analytics pipeline configuration level, or both; and
  identify at least one of the candidate electronic data analytics pipeline configurations as the optimized electronic data analytics pipeline based on the at least two of the recorded key performance indicator values on the task level, on the candidate electronic data analytics pipeline configuration level, or both.

12. The computer programming product according to claim 11, further comprising computer readable program instructions that, when executed configure the at least one processor to, identify the optimal candidate electronic data analytics pipeline configuration for all the desired key performance indicators.

13. The computer programming product according to claim 11, further comprising computer readable program instructions that, when executed configure the at least one processor to, apply fine tune variations that reorganize the order of one or more tasks in the existing electronic data analytics pipeline.

14. The computer programming product according to claim 11, further comprising computer readable program instructions that, when executed configure the at least one processor to, convert one or more serial tasks to one or more parallel tasks in the candidate electronic data analytics pipeline configurations, and vice versa.

15. The computer programming product according to claim 11, further comprising computer readable program instructions that, when executed configure the at least one processor to, perform at least one of a task group to the candidate electronic data analytics pipeline configurations, wherein the task group consists of one of: reconfiguring one or more tasks, updating one or more tasks, re-ordering one or more tasks, and combinations thereof.

16. The computer programming product according to claim 11, further comprising computer readable program instructions that, when executed configure the at least one processor to, identify a top M tasks that have an outsized effect on one or more of the desired key performance identifiers.

17. The computer programming product according to claim 11, further comprising computer readable instructions that when executed configure the at least one processor to determine which tasks have the least effect on the accuracy score of the existing electronic data analytics pipeline identified for optimization and remove or reconfigure those tasks as part of identifying candidate electronic data analytics pipeline configurations for simulation runs.

18. The computer programming product according to claim 11, further comprising computer readable instructions that when executed configure that at least one processor to run the optimized electronic data analytics pipeline to generate an output prediction.

19. A computer-implemented system to generate electronic alert reports based upon electronic data comprising:
  a non-transitory memory storage device storing program instructions; and
  a hardware processor having circuitry and logic to execute said program instructions, wherein the hardware processor is in communication with said memory storage device and in response to executing said program instructions is configured to:
  identify an existing electronic data analytics pipeline for optimization to produce an optimized electronic data analytics pipeline, wherein the electronic data analytics pipeline receives electronic data and comprises one or more tasks performed on the electronic input data to generate the alert report, one or more predictive models to receive electronic feature sets, and at least one of a processing group consisting of: one or more filters to process at least a portion of the electronic input data, one or more transform functions to process at least a portion of the electronic input data, or electronic output of the one or more filters, and combinations thereof to produce the electronic feature sets, wherein the one or more predictive models comprise at least one of a models group consisting of: a risk-by-association analyzer, a pattern determination model, a rules model, a regression analyzer, a clustering model, a machine-learning model, an ensemble model, a Hidden Markov Model, an Artificial Neural Network, and combinations thereof, and wherein the electronic data analytics pipeline determines what predictive models to use, what electronic data to use, and how to use the electronic data;
  receive desired key performance indicator values for the existing electronic data analytics pipeline identified for optimization, the desired key performance indicator values comprising an accuracy score for the existing electronic data analytics pipeline identified for optimization and at least one of a performance group consisting of: time for the existing electronic data analytics pipeline identified for optimization to run, amount of CPU for the existing electronic data analytics pipeline identified for optimization to run, amount of memory for the existing electronic data analytics pipeline identified for optimization to run, and combinations thereof;
  gather, on a task level basis, key performance indicator values on a task level from previous runs of the existing electronic data analytics pipeline identified for optimization;
  identify one or more hotspot tasks in the existing electronic data analytics pipeline that are not susceptible to improving the existing electronic data analytics pipeline identified for optimization;
  identify one or more tasks from the existing electronic data analytics pipeline identified for optimization that have no or negligible effect on the existing electronic data analytics pipeline identified for optimization;
  identify, by using the gathered key performance indicators on the task level from previous runs of the existing electronic data analytics pipeline identified for optimization, candidate electronic data analytics pipeline configurations for simulation runs, wherein the candidate electronic data analytics pipeline configurations identified for the simulation runs comprises reconfiguring at least one of a group consisting of: the one or more tasks, the one or more filters, the one or more transform functions, the one or more predictive models, and combinations thereof of the existing electronic data analytics pipeline identified for optimization including removing the one or more tasks from the existing electronic data analytics pipeline identified for optimization that have no or negligible effect on the accuracy score of the existing electronic data analytics pipeline identified for optimization;
  create a matrix of candidate electronic data analytics pipeline configurations for simulation runs;
  run simulations of the candidate electronic data analytics pipeline configurations identified for the simulation runs;
  record for each simulation run of each of the candidate electronics data analytics pipeline configurations identified for the simulation runs at least two of the desired key performance indicator values indicators on the task level, on a candidate electronics data analytics pipeline configuration level, or both;
  analyze the simulation runs of the candidate electronic data analytics pipeline configurations identified for the simulation runs based on the at least two of the recorded key performance indicator values on the task level, on the candidate electronic data analytics pipeline configuration level, or both; and
  identify at least one of the candidate electronic data analytics pipeline configurations as the optimized candidate electronic data analytics pipeline configurations based upon the at least two recorded key performance indicator values.

20. The system according to claim 19, further comprising: running the optimized electronic data analytics pipeline to generate an output prediction; and generating a report based upon the output prediction.

* * * * *